United States Patent [19]
Goetz et al.

[11] Patent Number: 5,964,097
[45] Date of Patent: Oct. 12, 1999

[54] THERMOCHEMICAL DEVICE FOR PRODUCING COLD AND/OR HEAT

[75] Inventors: Vincent Goetz, Perpignan; Bernard Spinner, Corneilla-del-Vercol, both of France

[73] Assignee: Elf Aquitaine, France

[21] Appl. No.: 08/973,750

[22] PCT Filed: Apr. 24, 1997

[86] PCT No.: PCT/FR97/00731

§ 371 Date: Mar. 10, 1998

§ 102(e) Date: Mar. 10, 1998

[87] PCT Pub. No.: WO97/40328

PCT Pub. Date: Oct. 30, 1997

[30] Foreign Application Priority Data

Apr. 25, 1996 [FR] France .................................. 96 05265

[51] Int. Cl.$^6$ ............................ F25B 17/08; F25B 35/04
[52] U.S. Cl. .............................................. 62/101; 62/480
[58] Field of Search ............................ 62/476, 101, 480; 165/104.12

[56] References Cited

U.S. PATENT DOCUMENTS

| | | | |
|---|---|---|---|
| 1,854,589 | 4/1932 | Keyes . | |
| 4,682,476 | 7/1987 | Payre et al. | 62/480 |
| 4,784,217 | 11/1988 | Payre et al. | 165/104 |
| 4,873,842 | 10/1989 | Payre et al. | 62/480 |
| 4,875,346 | 10/1989 | Jones et al. | 62/467 |
| 4,906,258 | 3/1990 | Balat et al. | 55/74 |
| 5,056,591 | 10/1991 | Spinner et al. | 165/104.16 |
| 5,057,132 | 10/1991 | Lebrun et al. | 62/4 |
| 5,083,607 | 1/1992 | Lebrun et al. | 165/104.12 |
| 5,161,389 | 11/1992 | Rockenfeller et al. | 62/480 |
| 5,186,020 | 2/1993 | Rockenfeller et al. | 62/457.9 |
| 5,271,239 | 12/1993 | Rockenfeller et al. | 62/259 |
| 5,283,219 | 2/1994 | Mauran et al. | 502/417 |
| 5,291,942 | 3/1994 | Ryan | 165/104 |
| 5,396,775 | 3/1995 | Rockenfeller et al. | 62/112 |
| 5,445,217 | 8/1995 | Castaing et al. | 165/104.12 |
| 5,477,706 | 12/1995 | Kirol et al. | 62/480 |
| 5,619,866 | 4/1997 | Sato et al. | 62/480 |
| 5,628,205 | 5/1997 | Rockenfeller et al. | 62/480 |
| 5,661,986 | 9/1997 | Labranque | 62/480 |

FOREIGN PATENT DOCUMENTS 0 515 865  12/1992  European Pat. Off. .

*Primary Examiner*—William Doerrler
*Attorney, Agent, or Firm*—Bacon & Thomas, PLLC

[57] ABSTRACT

Device for producing by chemical reaction cold and/or heat, comprising two reactors containing each an associated salt susceptible of reacting chemically with a gas and dispersed into a porous support, a housing intended to receive the gas from the reactors and a housing intended to deliver the gas to the reactors. Accordingly to the invention, the reactors are arranged in direct contact and in such a way that the heat transfer between each other takes place only by conduction. A process for implementing the chemical reactions between at least one salt and one gas within such a device to product cold and/or heat is also disclosed.

3 Claims, 4 Drawing Sheets

THERMOCHEMICAL DEVICE FOR PRODUCING COLD AND/OR HEAT

BACKGROUND OF THE INVENTION

The present invention relates to a device for producing cold and/or heat by a solid/gas reaction.

DESCRIPTION OF RELATED ART

The device intended by the invention is based on the use of the so-called "thermochemical pump" system, the main characteristics of which are as follows:

a reversible reaction between a solid and a gas is used as a "chemical engine", this reaction being of the type:

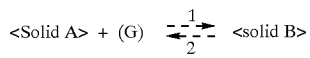

The reaction is exothermic in direction 1, which means that in this direction it produces heat, and endothermic in the direction 2, that is to say that in this direction it produces cold.

Such a system enables energy to be stored in the chemical form and has various fields of application.

In addition, such a system makes it possible, using a heat source at a temperature Ts, to produce heat at a temperature Tu such that:

Tu<Ts

In this case, the system is called a "chemical heat pump".

Such a system also makes it possible, using a heat source at a temperature T's, to produce heat at a temperature T'u such that:

T'u>T's

In this case, the system is called a "chemical thermoconverter".

By virtue of this system, it is possible to produce refrigerating power using a heat source and simultaneously to produce, using a heat source at a temperature T"s, heat at a temperature T"u (T"u<T"s) and refrigerating power.

Depending on the circumstances, the heat or cold produced is used at the same time as the consumption of energy at high temperature (Ts, T's, T"s) or at a later time (storage effect).

Document EP-A-0,382,586 discloses a device for the production of cold and/or heat by a solid/gas reaction, comprising two reactors, each containing a different salt capable of reacting chemically with a gas within suitable temperature and pressure ranges, an evaporator and a condenser. As described in this document, the choice of two salts placed differently in the Clapeyron diagram makes it possible, during one of the phases of the operating cycle, to use the heat of reaction for synthesis of the salt lying within the high-temperature range to carry out the decomposition reaction (requiring a supply of energy) of the salt lying within the low-temperature range. This heat transfer which takes place via a heat-transfer fluid flowing between the two reactors has the effect of improving the energy efficiency.

However, this improved efficiency of the system does not completely satisfy the commercial requirements needed for such a system, for example because the device requires many control valves.

Document FR-A-2,653,541 discloses a device for producing cold and/or heat by a solid/gas reaction comprising reaction chambers, each containing a different salt capable of reacting with a gas within suitable temperature and pressure ranges, an evaporator and a condenser. Execution of the operating cycle makes it possible, as in the case of Document EP-A-0,382,586, to effect an internal energy recovery phase between the two solid/gas reactors. However, in this case, the management of the thermodynamic operating cycle, and in particular the recovery phase, are provided by the use of several gravitational heat pipes.

SUMMARY OF THE INVENTION

The subject of the present invention is therefore a device for producing cold and/or heat by a solid/gas reaction, which performs well but requires a smaller number of valves and of ancillary devices for transferring heat.

In order to achieve this objective, the invention provides a device for producing cold and/or heat by a chemical reaction which comprises two reactors each containing an associated salt (S1; S2) capable of reacting chemically with a gas and dispersed in a porous support, an enclosure designed to receive the gas from the reactors and an enclosure designed to deliver the gas to the reactors, characterized in that the reactors are placed in direct contact and are arranged so that the heat transfer between them takes place solely by conduction.

The present invention also provides a process for carrying out chemical reactions between at least one salt and a gas within a device for producing cold and/or heat, the device comprising two reactors each containing an associated salt placed in a porous support, an enclosure designed to receive the gas from the reactors and an enclosure designed to deliver the gas to the reactors, the process comprising the steps which consist in:

running a first reactor, by making its salt react with the gas, between the pressure of the enclosure designed to receive the gas and the pressure of the enclosure designed to deliver the gas and, simultaneously, running the second reactor, by making its salt react with the gas, between the pressure of the enclosure designed to receive the gas and a pressure below that of the enclosure designed to deliver the gas to the first reactor.

The advantages and the operation of the present invention will emerge more clearly on reading the following description couched in a non-limiting manner with reference to the appended drawings.

BRIEF DESCRIPTION OF THE FIGURES OF DRAWINGS

FIG. 1 is a diagrammatic view of a device for producing cold and/or heat, according to the invention; and FIGS. 2 to 7 each represent a Clapeyron diagram illustrating the operation of devices according to the invention.

DETAILED DESCRIPTION OF THE PREFERRED EMBODIMENT

Figure 1:
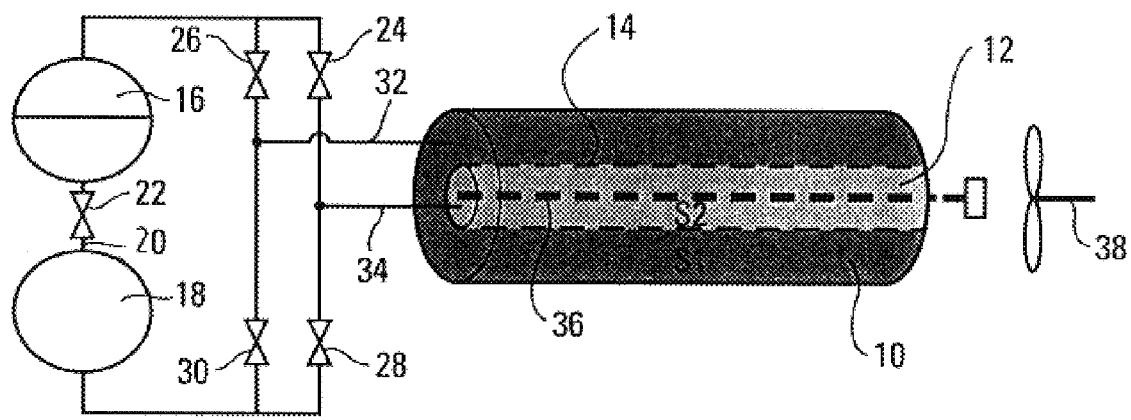

FIG. 1 shows a device for producing cold and/or heat, according to the invention, which comprises two reaction chambers or reactors, 10; 12, which, in the example illustrated, are cylindrical, one of the reactors, in this case 12, having a smaller diameter, being placed substantially coaxially inside the other reactor 10. The two reactors have the same axial length and are separated by a non-porous wall 14.

The device furthermore comprises a condenser 16 and an evaporator 18 which are connected by a pipe 20 provided with a pressure-reducing valve 22. The condenser and the evaporator 18 thus form enclosures designed to receive and to release the gas, respectively. A set of four valves 24, 26, 28 and 30 makes it possible to connect either of the reactors 10, 12 selectively to the condenser 16 and to the evaporator 18 via pipes 32 and 34. In the example shown in FIG. 1, an electrical resistance element 36 is placed axially inside the reactor 12, enabling the latter to be selectively heated. However, the operating principle of the process obviously applies to any other mode of heating the reactor 12, which may, by way of non-limiting examples, consist of a gas burner, a flow of heat-transfer fluid inside a pipe, or a phenomenon involving the condensation of a fluid contained in a heat pipe.

Finally, the device also comprises a fan 38 placed at one end of the reactors 10 and 12, enabling them to be selectively cooled. Here too, the mode of cooling constitutes merely one example intended to illustrate the operation of the process, and any other type of cooling may also be used without modifying the execution of the various phases of the cycle.

The reactors 10 and 12 are each provided with a salt, respectively S1 and S2, which is mixed with, or dispersed in, a porous support. In a preferred embodiment, the porous support comprises recompressed expanded graphite having a relative density of between 0.05 and 0.5.

The operation of the device will now be described with reference to the Clapeyron diagrams of FIGS. 2 to 5.

Figure 2:
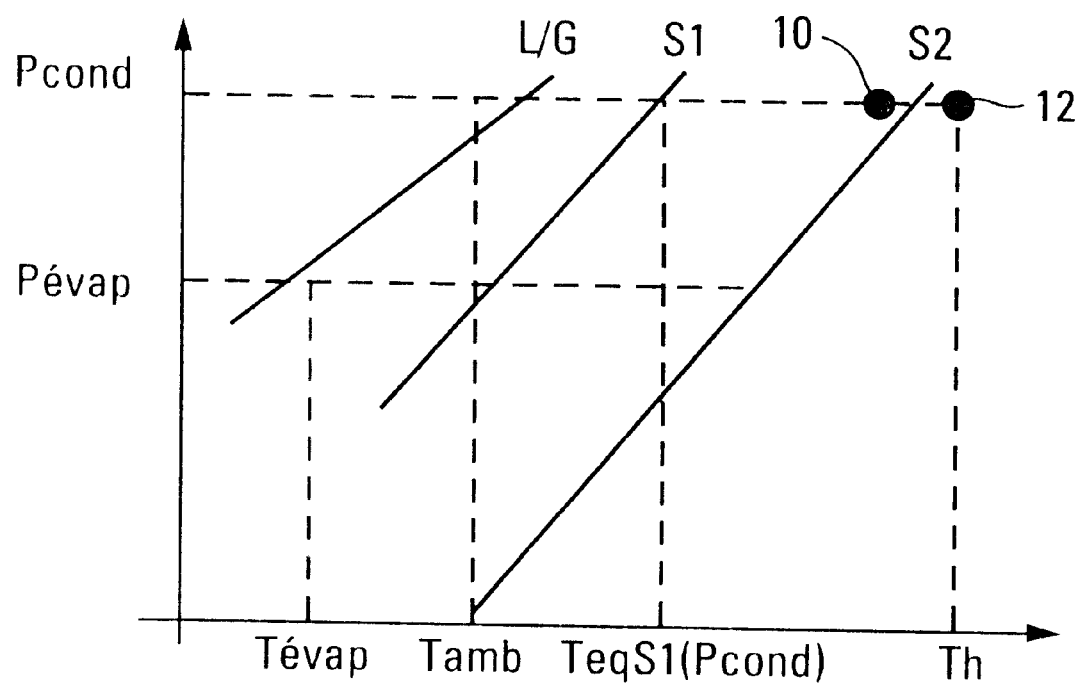

The initial state of the operating cycle of the device is shown in the diagram of FIG. 2. At this instant, the two salts S1 and S2 have undergone their decomposition and are at the pressure of the condenser 16, Pcond. The electrical resistance element 36 in direct contact with the salt S2 is energized and heats the salt S2 to a high temperature Th. The fan 38 is switched off. The salt S1, placed around the reactor 12 containing the salt S2, is heated by the latter up to a temperature lying between Th and its equilibrium temperature at the pressure of the condenser 16, TeqS1(Pcond). The positions of the reactors 10 and 12 are shown in FIG. 2 by dots 10, 12.

Figure 3:
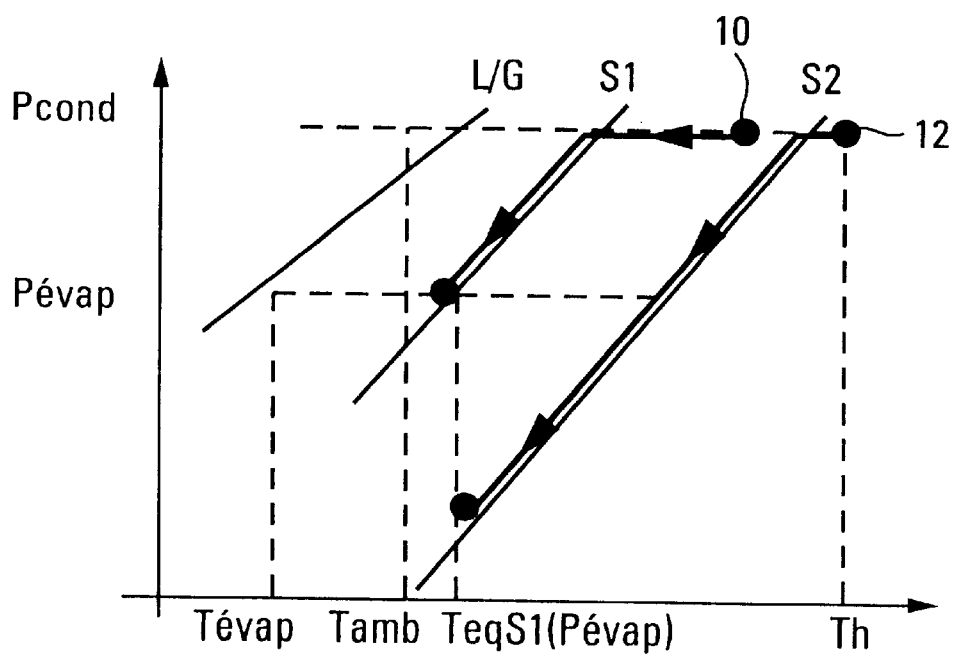

The first step in the operating process of the device according to the invention is shown in FIG. 3. During this step, the electrical resistance element 36 is off and the fan 38 is on.

Cooling the reactor 10 containing the salt S1 decreases its temperature. It also crosses its equilibrium line and passes into the synthesis condition. It is then isolated from the condenser. As a result, the drop in temperature of the reactor 10 is accompanied by a decrease in its pressure, the salt following its equilibrium line. When the pressure of the reactor 10 reaches the pressure Pevap of the evaporator 18, these are brought into communication with each other by opening the valve 30, the other valves remaining closed. The salt S1 undergoes its synthesis reaction, involving the production of cold by evaporating at Tevap.

Since the reactor 12 containing the salt S2 is in thermal contact with S1 via the wall 14, cooling the reactor 10 containing the salt S1 causes the salt S2 to cool, which crosses its equilibrium line and passes into the synthesis condition. The reactor 12 is then isolated from the condenser 16. As a result, the drop in temperature of the reactor 12 is accompanied by a decrease in its pressure, the salt S2 following its equilibrium line. The reactor 12 is then at a pressure below that (Pevap) of the evaporator 18.

During the phase of synthesis of the salt S1, the reactor 12 containing the salt S2 remains isolated from the evaporator 18, by closing the valves, thus preventing any reaction. It therefore remains on its equilibrium line and, because of the thermal contact via the wall 14 with the inside of the reactor 10 containing the salt S1, is at a temperature close to TeqS1 (Pevap).

Figure 4:
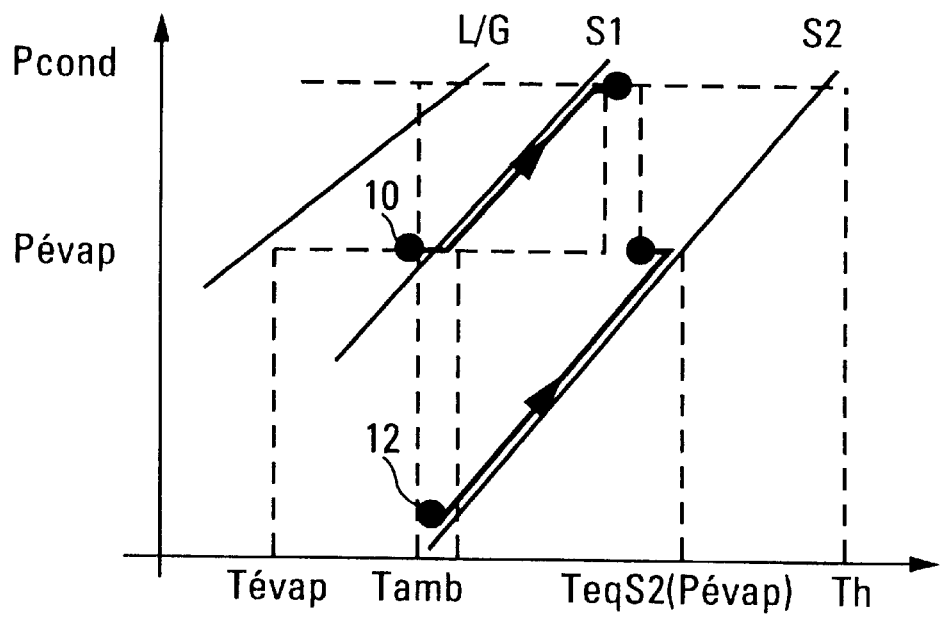

The second step in the process is shown in FIG. 4. During this step, the fan 38 is off. The reactor 12 containing the salt S2 is brought into communication with the evaporator, thus placing the salt in the synthesis condition. The heat produced due to the reaction raises the temperature of S2 which is then at the pressure Pevap and at a temperature close to TeqS2 (Pevap). The synthesis of S2 produces cold, by evaporation, at Tevap.

Since the reactor 10 containing the salt S1 is in thermal contact with the reactor 12 via the wall 14, the rise in temperature of the salt S2 increases the temperature of the salt S1. The salt S1 crosses its equilibrium line and lies in the decomposition condition. The reactor 10 is then isolated from the evaporator. As a result, the increase in temperature of the salt S1 is accompanied by an increase in pressure, the salt following its equilibrium line. When the pressure of the salt S1 reaches the pressure of the condenser 16 these are brought into communication with each other by opening the valve 26. The salt S1 undergoes its decomposition, the energy necessary for the reaction being directly supplied by thermal contact via the exothermic synthesis of the salt S2.

Figure 5:
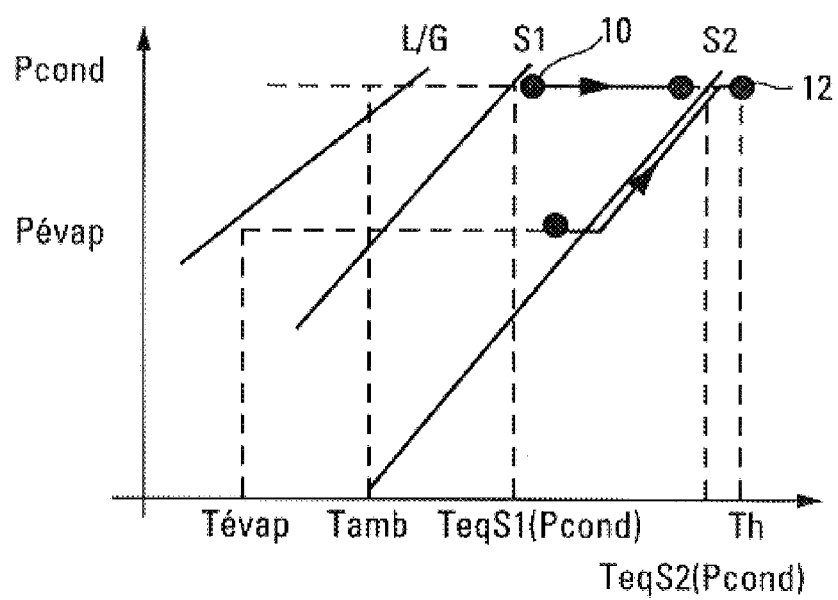

Next, the operating process of the device passes to its third step, shown in FIG. 5.

At the start of this step, the electrical resistance element 36 is turned on.

The salt S2 is thus heated again, and, passing through its equilibrium line, lies in the decomposition condition. The reactor 12 is then isolated from the evaporator. As a result, the increase in temperature of the salt S2 is accompanied by an increase in pressure, the salt following its equilibrium line. When the pressure of the salt S2 reaches the pressure of the condenser 16, Pcond, these are brought into communication with each other by opening the valve 24, the other valves remaining closed. The salt S2 of the reactor 12 undergoes its decomposition.

During this phase, the reactor, the salt S1 of which has already undergone its decomposition, remains in communication with the condenser 16 which imposes its pressure Pcond. As a result of the thermal contact between the reactors 10 and 12, the reactor 10 is heated from TeqS1 (Pcond) to a temperature close to TeqS2(Pcond).

Over the complete cycle, two useful cold-producing effects occur by evaporation, corresponding to the syntheses of the salts S1 and S2 and a quantity of energy corresponding to a single decomposition (decomposition of the salt S2) is delivered. Neglecting the sensitive-heat terms, the calculation of the ideal COP of the cycle therefore leads to:

$$COP_{ideal} = \frac{2 \cdot \Delta_{evap}}{\Delta H_{reaction}}$$

This mode of internal recovery, by direct thermal contact between salts placed differently in the Clapeyron diagram, may easily be extended to the case of three reactive salts S1, S2 and S3. In this case, the reactors containing the reactive salts will consist of three coaxial enclosures. The smallest diameter enclosure contains the salt (S3) which reacts at high temperature, the outer enclosure contains the salt (S1) which reacts at low temperature, and the enclosure lying between the two previous enclosures contains the salt (S2) which reacts at an intermediate temperature. In the case of the use of three salts, the cycle, which comprises an additional step, makes it possible for three useful cold-producing steps to occur by evaporation, corresponding to the syntheses of the salts S1, S2 and S3. A quantity of energy corresponding to the decomposition of the salt S3 is delivered.

Figure 6:
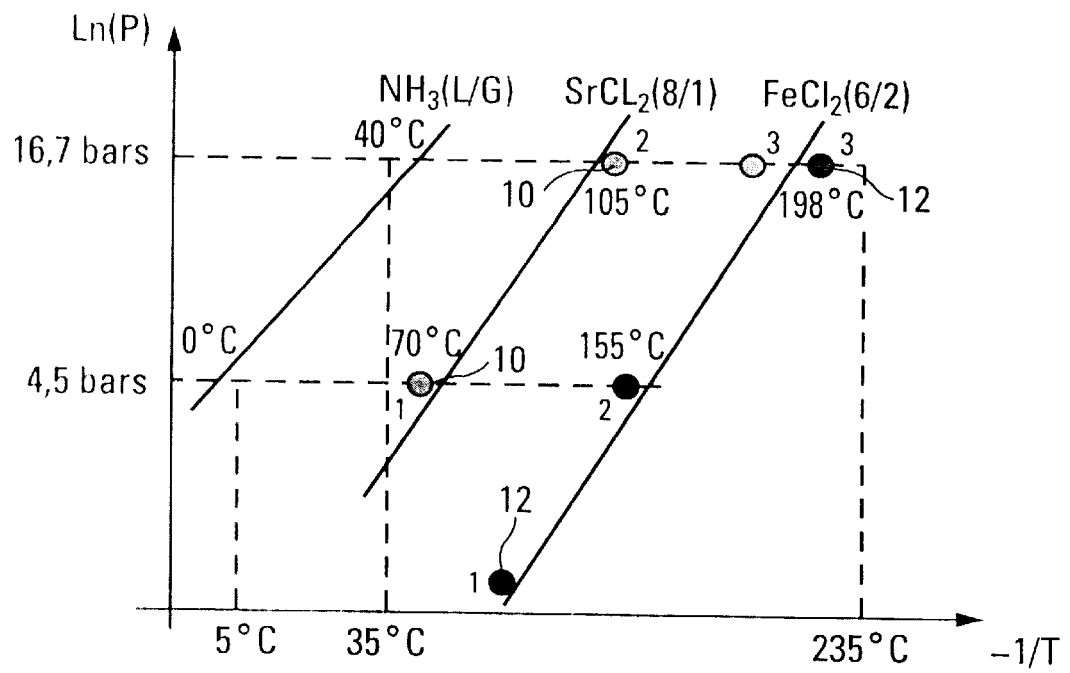
Figure 7:
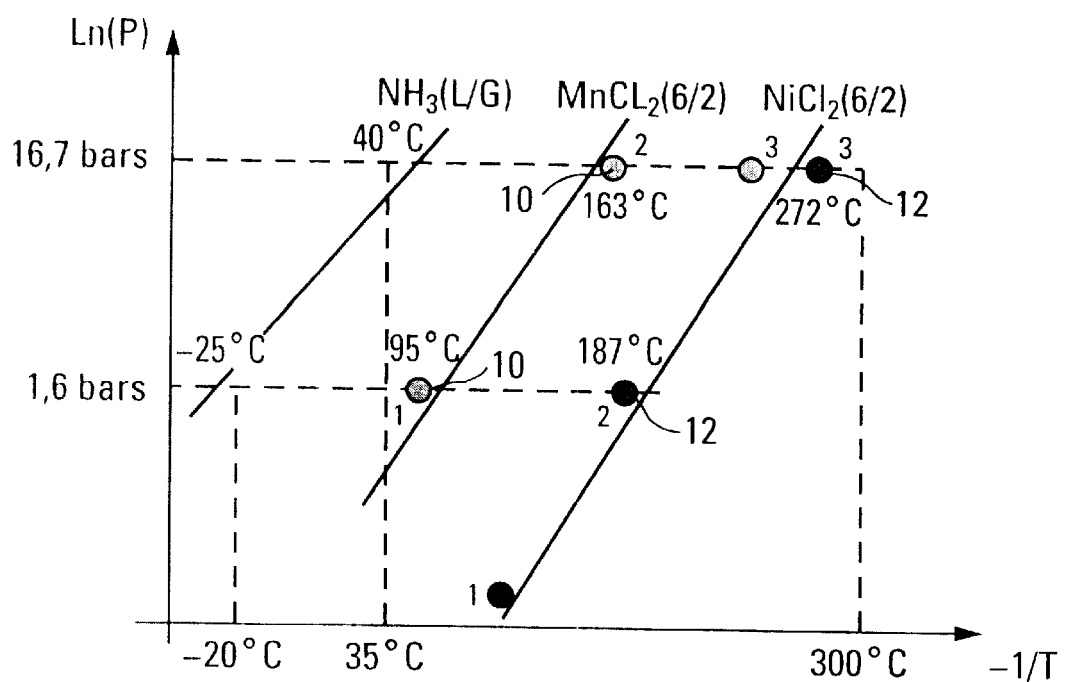

In order to complete the above description, two illustrative embodiments of the process according to the invention are given below by way of non-limiting example. FIGS. 6 and 7 each show a Clapeyron diagram similar to those of FIGS. 2 to 5.

The process shown diagrammatically in FIG. 6 is designed to produce cold at a temperature of 5° C., which is suitable for air conditioning, the ambient temperature being 35° C. The first reactor 10 contains $SrCl_2$ which reacts with 7 mols of ammonia. The second reactor 12 contains $FeCl_2$ which has a stoichiometry coefficient equal to 4. Indicated in FIG. 6 by the solid symbols are the equilibrium temperatures of the two salts at the evaporation and condensation pressures, as well as their positions during the three steps which characterize the execution of the operating cycle.

Shown diagrammatically in FIG. 7 is a process for producing cold at a temperature of −20° C. This process is particularly suitable for freezing, with an ambient temperature of 35° C. The first reactor 10 contains $MnCl_2$ which reacts with 4 mols of ammonia. The second reactor 12 contains $NiCl_2$ which has a stoichiometry coefficient equal to 4. Indicated in the figure by solid symbols are the equilibrium temperatures of these two salts at the evaporation and condensation pressures, as well as their positions during the three steps which characterize the execution of the operating cycle.

In an alternative embodiment, the condenser 16 and the evaporator 18 may be replaced, each by a reactor, similar to the reactors 10, 12. The reactors form, respectively, an enclosure designed to receive the gas and an enclosure designed to deliver the gas to the reactors (10, 12).

What is claimed is:

1. Process for carrying out chemical reactions between at least one salt and a gas within a device for producing cold and/or heat, the device comprising two reactors each containing an associated salt placed in a porous support, an enclosure designed to receive the gas from the reactors and an enclosure designed to deliver the gas to the reactors, the process comprising the steps of:

running a first reactor, by making its salt react with the gas, between the pressure of the enclosure designed to receive the gas and the pressure of the enclosure designed to deliver the gas and, simultaneously, running the second reactor, by making its salt react with the gas, between the pressure of the enclosure designed to receive the gas and a pressure below that of the enclosure designed to deliver the gas to the first reactor.

2. Process according to claim 1, wherein the enclosure designed to receive the gas from the reactors and the enclosure designed to deliver the gas to the reactors each comprise an associate reactor.

3. Process according to claim 1, wherein the enclosure designed to receive the gas from the reactors comprises a condensor and the enclosure designed to deliver the gas to the reactors comprises an evaporator.

* * * * *